United States Patent
Snider

(10) Patent No.: US 6,502,379 B1
(45) Date of Patent: Jan. 7, 2003

(54) CROP HARVESTING HEADER WITH CAM CONTROLLED MOVEMENT OF THE REEL FINGERS

(75) Inventor: Geoffrey U. Snider, Winnipeg (CA)

(73) Assignee: MacDon Industries Ltd., Winnipeg (CA)

( * ) Notice: Subject to any disclaimer, the term of this patent is extended or adjusted under 35 U.S.C. 154(b) by 0 days.

(21) Appl. No.: 09/973,469

(22) Filed: Oct. 10, 2001

(51) Int. Cl.$^7$ .............................................. A01D 57/02
(52) U.S. Cl. ...................................................... 56/221
(58) Field of Search ........................ 56/220, 221, 222, 56/223, 224, 225, 226, 227, 364, 120, 130

(56) References Cited

U.S. PATENT DOCUMENTS

| | | | |
|---|---|---|---|
| 4,751,809 A | 6/1988 | Fox et al. | |
| 4,936,082 A | * 6/1990 | Majkrzak | 56/220 |
| 5,007,235 A | * 4/1991 | Nickel et al. | 56/12.4 |
| 5,768,870 A | * 6/1998 | Talbot et al. | 56/364 |
| 6,170,244 B1 | 1/2001 | Coers et al. | |
| 6,442,918 B1 | * 9/2002 | Fox | 56/221 |

FOREIGN PATENT DOCUMENTS

CA     2289164     10/2000     .......... A01D/57/03

* cited by examiner

Primary Examiner—Robert E. Pezzuto
(74) Attorney, Agent, or Firm—Adrian D. Battison; Michael R. Williams; Ryan W. Dupuis

(57) ABSTRACT

A crop harvesting header includes a cutter bar and a reel for controlling movement of the crop in the area over the cutter bar. The reel is rotatable about an axis generally parallel to the cutter bar and has a plurality of reel bats each having reel fingers projecting generally radially outwardly from the reel axis. The reel bats are pivotal each about a respective bat axis parallel to the reel axis so as to vary the angle of the fingers about the bat axis as the reel rotates. The reel co-operates with a cam carried on the header in generally stationary position so that each bat has a crank arm with a cam follower on the crank arm which follows the cam as the reel rotates and causes the required pivotal movement of the bat. The crank arm is arranged at an angle of the order of 135 degrees to the bat fingers so that the cam follower is angularly advanced in the cam relative to the bat axis. This provides significant mechanical advantages and allows use of longer crank arms thus reducing loadings and wear on the cam and followers.

13 Claims, 3 Drawing Sheets

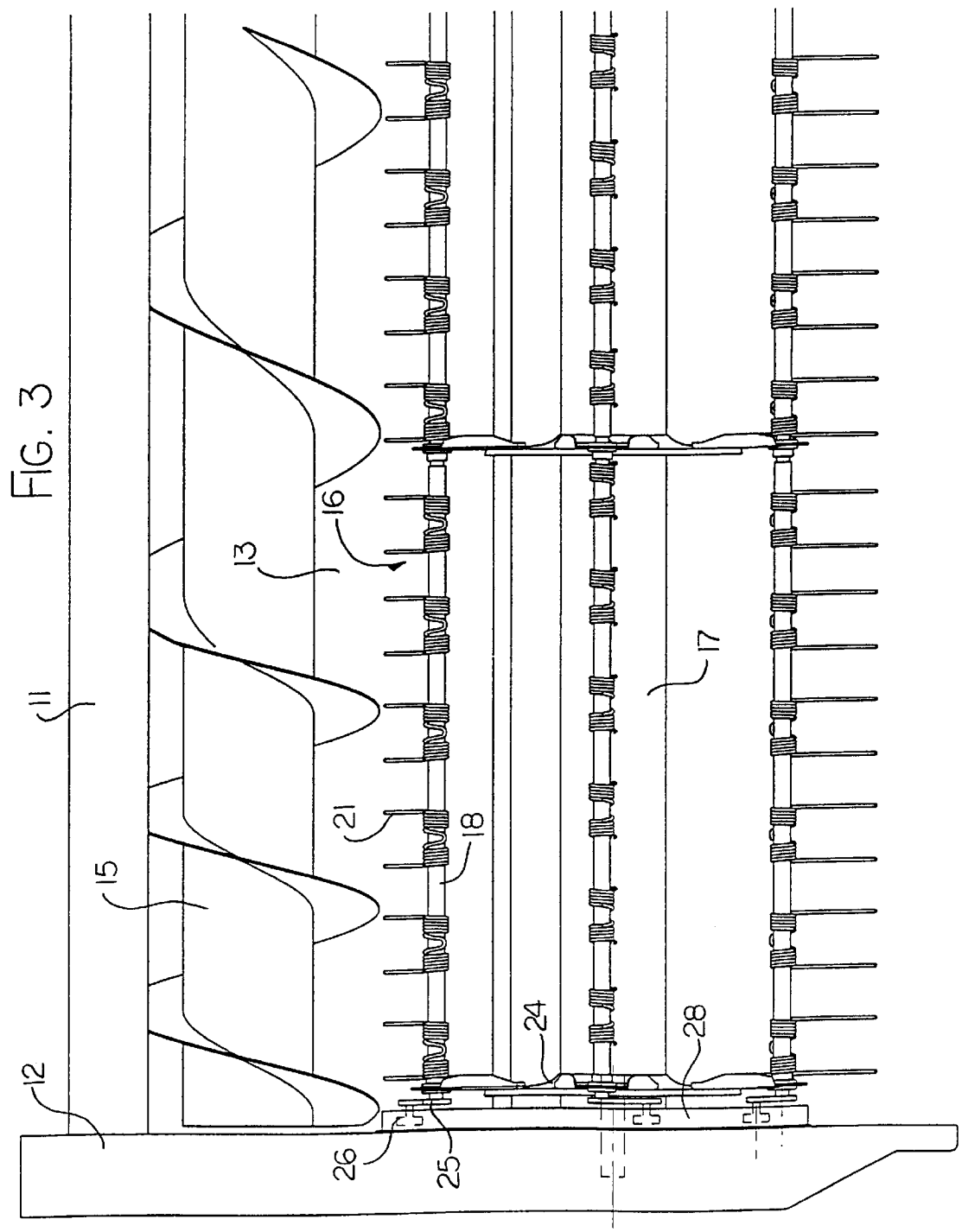

CROP HARVESTING HEADER WITH CAM CONTROLLED MOVEMENT OF THE REEL FINGERS

This invention relates to a crop harvesting header including a cutter bar and a reel for controlling movement of the crop in the area over the cutter bar. The reel is rotatable about an axis generally parallel to the cutter bar and has a plurality of reel bats each having reel fingers projecting generally radially outwardly from the reel axis. The reel bats are pivotal each about a respective bat axis parallel to the reel axis so as to vary the angle of the fingers about the bat axis as the reel rotates. The reel co-operates with a cam carried on the header in generally stationary position so that each bat has a crank arm with a cam follower on the crank arm which follows the cam as the reel rotates and causes the required pivotal movement of the bat.

BACKGROUND OF THE INVENTION

Attention is directed to co-pending Application Serial No. 60/325,544 filed on the same filing date (Remillard) assigned to the same assignees which discloses a header using the same invention as set forth herein, the disclosure of which is incorporated herein by reference.

Some headers of the above type include a reel which has the reel axis fixed relative to the header and particularly the cutter bar. Many of these headers include a cam which is fixed on the end frame of the header and is shaped in a complex non-circular pattern so that the fingers follow a complex non-cylindrical path.

Other headers of this type include a reel which is mounted on reel arms which can raise and lower the reel relative to the cutter bar to provide different conditions for different crops.

In U.S. Pat. No. 4,751,809 (Fox et al) assigned to the present applicant is disclosed an arrangement in which the movement of the bats is controlled by a rotating ring carried by the reel on the same reel arms but rotating about an axis off-set from the reel axis.

In U.S. Pat. No. 6,170,244 (Coers et al) assigned to Deere and Company and in Canadian Application 2289164 also by the same inventor is disclosed an arrangement in which the reel is mounted on reel arms and there is provided a cam which is carried also on the reel arms so that it raises and lowers with the reel but it is held at a position so that it does not rotate with the reel and controls the angle of the bats by crank arms and cam followers travelling on the cam.

The present invention is concerned with headers including a reel both of the type in which the reel is fixed relative to the cutter bar and of the type in which the reel is mounted on arms which allow the reel to raise and lower relative to the cutter bar.

Pickup reels which use a cam path to establish desired finger angles relative to the cutting device are used on forage and crop harvesting equipment. Conventional designs use a rotating reel with one or more transversely mounted sets of fingers mounted at fixed radius to the reel center. Each set of fingers, on a bat, also has the ability to rock about its own axis of rotation that is parallel to the reel axis. A crank arm with a cam follower is fixed rigidly to each set of reel fingers. The cam follower follows a cam path that is shaped to change finger angle as the reel rotates.

SUMMARY OF THE INVENTION

It is one object of the present invention to provide a header which includes an improved drive to the bat fingers.

According to a first aspect of the invention there is provided a crop harvesting header comprising:

a header frame structure arranged for movement in a direction of working movement across ground carrying a crop to be harvested;

a cutter bar arranged across a forward edge of the header frame structure for cutting the crop;

a cut crop transport arrangement mounted on the header frame structure for receiving and transporting the cut crop for further processing;

and a reel for controlling movement of the crop in the area over the cutter bar;

the reel being mounted on the header frame structure for movement therewith in the direction of movement and for rotation about a reel axis generally parallel to the cutter bar;

the reel having a plurality of reel bats at spaced positions around the reel axis each having reel fingers projecting generally radially outwardly from the reel axis;

each of the reel bats being pivotal about a respective bat axis parallel to the reel axis so as to vary the angle of the fingers about the bat axis as the reel rotates;

a stationary cam mounted on the header frame structure at the reel in stationary position relative to the reel axis;

each bat having associated therewith a crank arm with a cam follower on the crank arm which follows the cam as the reel rotates such that the movement of the follower in the cam as the reel rotates relative to the cam causes the crank arm to move relative to the bat axis to generate the required pivotal movement of the bat;

wherein, for each of the bats, the cam follower is arranged in the cam at a position which is angularly advanced about the reel axis relative to the bat axis.

The header frame structure may include reel arms which support the reel and cam for up and down movement relative to the cutter bar or more preferably the reel may be directly mounted on end frame elements fixed relative to the cutter bar.

The term "bat" used herein is not intended to imply any particular shape or construction of the bat and this may comprise merely a tube, sometimes known as a tine tube, or other longitudinal structural member which carries the bat fingers so as to project radially outwardly from a longitudinal bat axis of the bat.

Preferably, for each bat, the respective crank arm has an end thereof opposite the cam follower directly connected to the bat at a fixed angle relative thereto. However other arrangements of the crank arm can be used including intervening links between the crank arm and the bat, for example of the type shown in the above mentioned copending application.

The fixed angle between the crank arm and the bat fingers while fixed during use may be adjustable to obtain different finger action.

In this arrangement, the opposite end of the crank arm is preferably fixed to the bat so as to rotate about the bat axis.

In this arrangement, the angle between the crank arm and the bat fingers is greater than 90 degrees, more preferably in the range 110 to 160 degrees and most preferably of the order of 135 degrees.

Preferably the cam is arranged such that the path length in a bottom half is less than a path length in an upper half.

Preferably the cam is arranged such that the cam lies radially inwardly of the path of the bat axes in a bottom part of the cam and lies radially outwardly of the path of the bat axes in an upper part of the cam.

Preferably the cam is arranged such that the path length thereof per degree of rotation of the reel is shorter in the angles of movement of the reel where the fingers are in engagement with the crop than at other angles.

Preferably the length of the crank arm from the bat axis to an axis of the cam follower is at least 3.0 inches and preferably of the order of 5.0 inches.

Preferably the reel is arranged such that the bat fingers at bottom dead center of the reel relative to the reel axis are in front of the cutter bar, such that the bat fingers follow a finger pattern in which the bat fingers are angularly advanced about the respective bat axis to the greatest extent at a position in front of bottom dead center, are generally radial at the bottom dead center and are angularly retarded to the greatest extent at a position behind and upwardly of the cutter bar.

The improved arrangement defined above may result in greater clearance to crop entry, improved mechanical advantages, improved range of motion and improved cam durability.

The major difference with the new invention is that the finger to crank arm angle is set so that the crank pushes the follower through the cam path rather than pulling the follower through the cam track as in conventional designs.

BRIEF DESCRIPTION OF THE DRAWINGS

One embodiment of the invention will now be described in conjunction with the accompanying drawings in which:

FIG. 3 is a top plan view of one end of the header of FIG. 1.

In the drawings like characters of reference indicate corresponding parts in the different figures.

DETAILED DESCRIPTION

Figure 1:
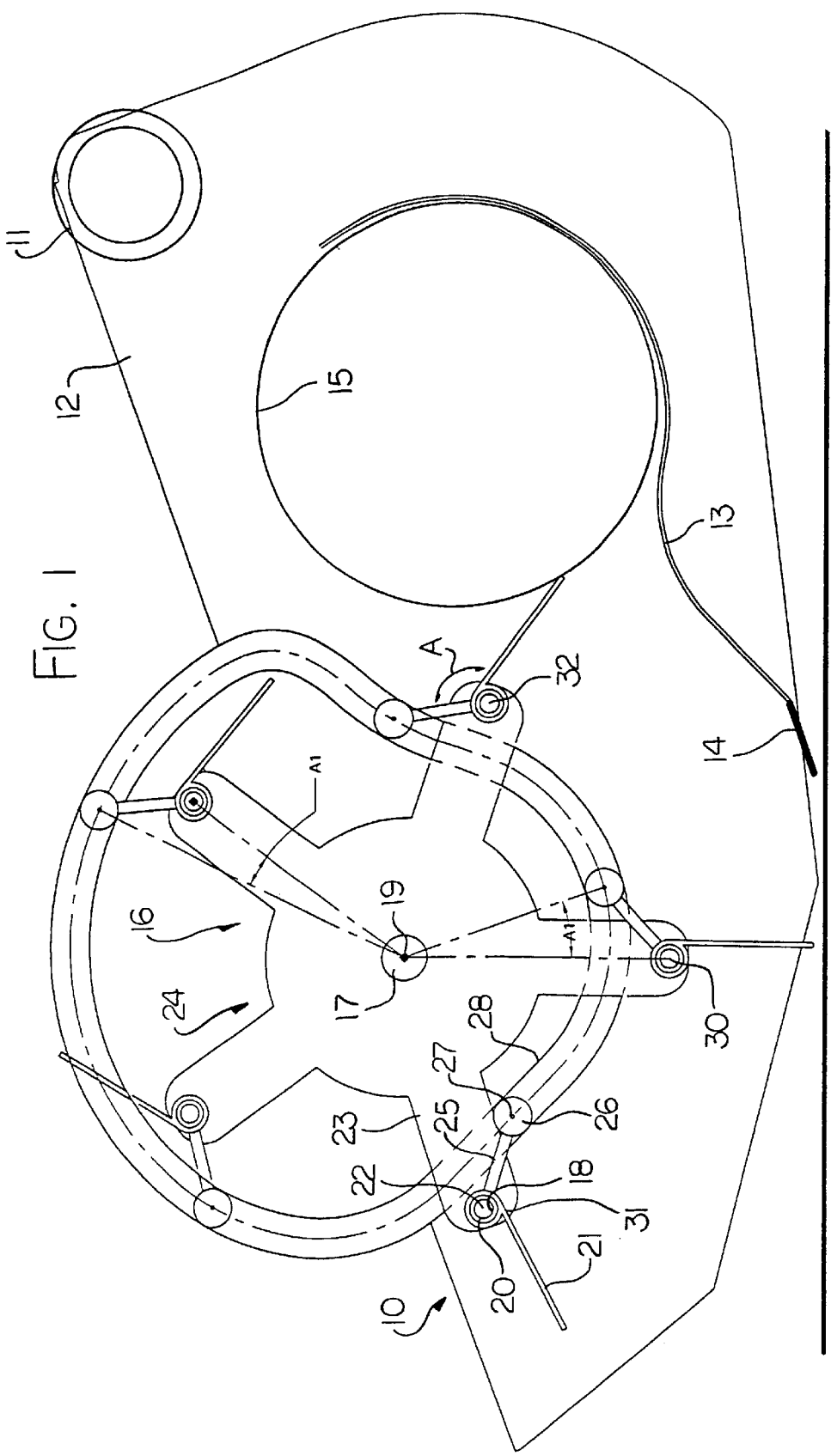
FIG. 1 is a schematic side elevational view of the frame, reel and cam of a header according to the present invention.

The embodiment shown in the drawings is related to the MacDon header for a self propelled auger which is currently sold under the model designation 922 which has been available for two years but a similar design under previous model numbers has been available for a number of years. A similar construction is used in the corresponding pull-type header which is sold under the model designation 5010. Thus the details of this machine are readily available to one skilled in the art and are not described and discussed herein except in relation to the particular aspect to which the invention relates.

However in general and schematically there is shown a frame structure generally indicated at 10 which includes a main beam 11 extending across the width of the frame and two end frame members 12 which extend downwardly and forwardly from the beam. The frame structure includes elements for mounting on a suitable tractor vehicle of a conventional nature. The frame structure includes a platform 13 onto which crop material is deposited after cutting by a cutter knife at a cutter bar 14. On the platform 13 is provided an auger roll 15 which receives the crop material from the cutter bar and carries the crop material to a discharge opening. All these elements are of course of conventional nature so that they will not be described in detail and various forms of cutter bar can be used all of which are available to one skilled in the art.

The end frames 12 carry a reel 16 which extends across the width of the header above the cutter bar 14. The reel comprises a shaft 17 mounted for rotation on the end frames so that the position of the shaft is fixed relative to the cutter bar 14. The shaft is located above and in front of the cutter bar and is carried on suitable bearings. The reel further includes a plurality of bats 18 at angularly spaced positions around the axis 19 of the shaft 17. In the embodiment shown each bat comprises a bat tube 20 to which is attached a plurality of bat fingers 21 which project outwardly from the bat tube at a predetermined angle. Thus, as is well known, each tube carries a plurality of bat fingers at spaced positions along its length with the bat fingers arranged at the same angle relative to the axis 22 of the bat.

The bat tubes 20 are mounted on reel support arms 23 of a support plate 24. The number of support plates along the length of the reel may variable in dependence upon the length of the reel so that the tubes may be supported at the plurality of spaced positions along the length of the reel to maintain the tubes at a predetermined radial spacing from the axis 19.

Each tube includes a crank arm 25 which is attached to the tube so that an inner end of the crank arm rotates with the tube around the axis 22. Thus each crank arm is attached to its respective bat tube at a predetermined set angle relative to the bat fingers, although this angle may be adjustable.

Each crank arm 25 includes a cam follower 26 at its outer end mounted for rotation on the crank arm about a follower axis 27. The cam follower comprises a roller received between two side walls of a cam track 28 extending in a path around the axis 19 of the reel. The cam defines a complete path around the axis of the reel but is offset from the axis and is non-circular so that the crank arms are moved so as to rotate around the respective bat axis to define a particular finger pattern of movement of the fingers as the reel rotates.

Conventionally the finger pattern is arranged so that, at a bottom dead center position indicated at 30, the fingers extend substantially radially outwardly from the axis 19. At a position 31 forwardly of the bottom dead center position, the fingers are angularly advanced around the bat axis 22 so that they extend forwardly from a radius of the reel. At a third position 32 rearwardly of the bottom dead center position, the fingers are retarded relative to the radius from the axis 19. This general finger pattern has been used for many years and is accepted to provide the required action on the crop so that the angularly advanced position of the fingers as the fingers enter the crop is advantageous in a grasping action on the crop followed by the crop being carried rearwardly by the radial fingers at the bottom dead center and then at the position rearward of the cutter bar, the fingers move to a retarded position so that they can more effectively lift out of the crop lying on the platform.

Slight modifications to this general finger pattern can be used as will be known to one skilled in the art, for example the finger pattern may include a further advancement of the fingers to an angularly advanced position at the location where the fingers pass over the cutter bar so as to more effectively clear the cutter bar.

Figure 2:
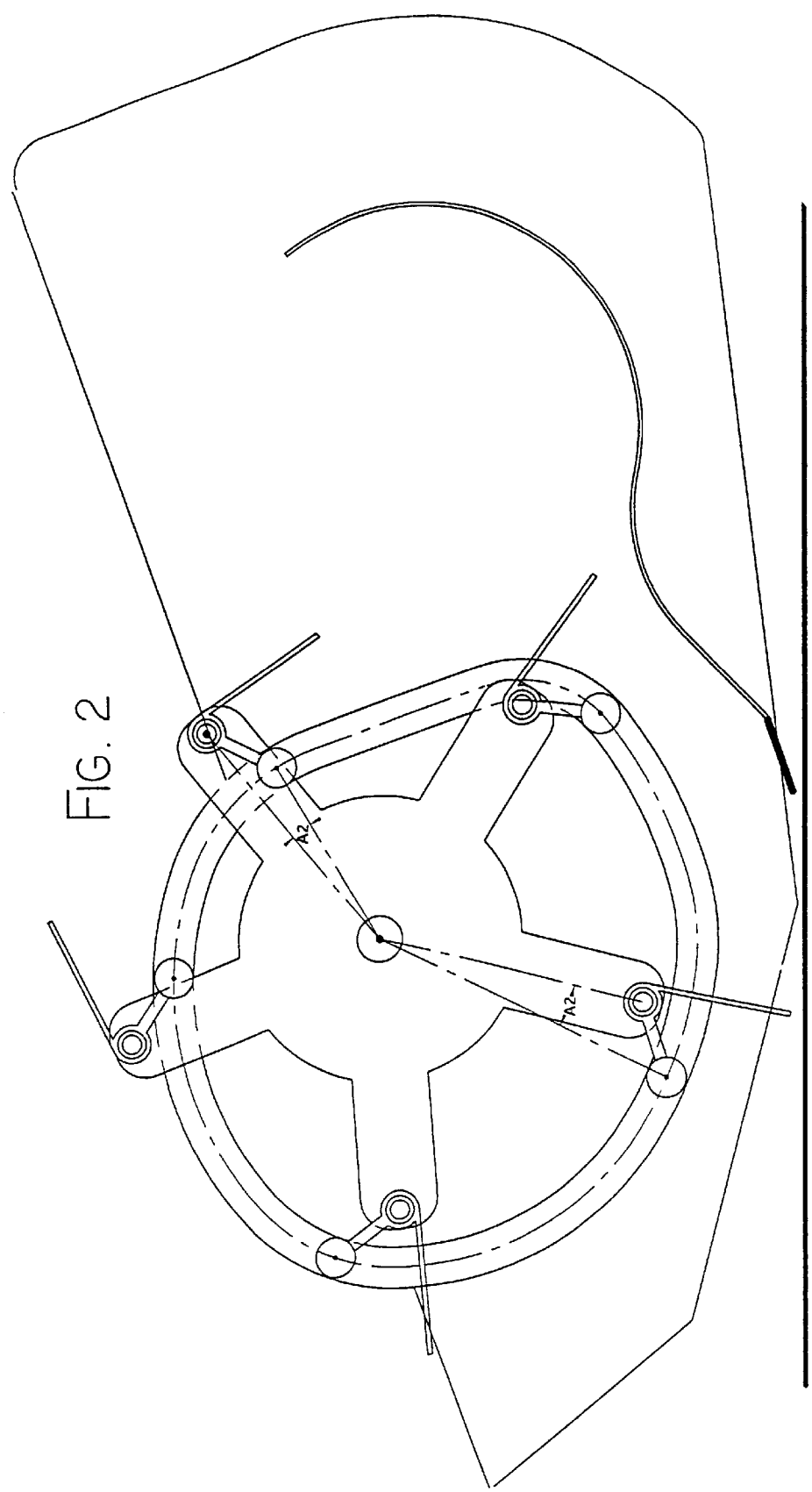
FIG. 2 is a similar schematic side elevational view of the frame, reel and cam of a conventional header.

The above description relates equally to the present invention and to the conventional arrangement shown in FIG. 2.

The arrangement of the present invention is modified relative to the conventional arrangement in that instead of the cam followers 26 being angularly behind the respective bat axis so as to be pulled in the cam track, in the present invention the cam followers are moved to a position angularly advanced of the respective bat axis so that the cam followers are pushed within the cam track.

While this modification may on the face of it appear to be relatively minor, this modification is counter-intuitive since it would normally be expected that the pulling of the cam follower would provide reduced forces and reduced wear. However complex calculations show that, contrary to this expected situation as adopted in all conventional arrangements of this type, the movement of the cam follower to an advanced position provides significant advantages in reducing loads between the cam track and the cam follower and decreasing wear on the components. These advantages are set forth in more detail herein after.

This arrangement further provides an angle A between the crank arm and the bat fingers which is greater than 90 degrees and more preferably of the angle set forth herein before.

Yet further this arrangement allows an increase in the length of the crank arm by an amount of the order of 25 percent. Thus the crank arm can have a length as defined herein before and this increased length thus provides increased mechanical advantage and thus reduce loads on the cam follower.

It will be noted that the cam path which is shaped to provide the conventional finger action is completely different in the arrangement of the present invention shown in FIG. 1 relative to the conventional arrangement. Thus it will be noted that the cam path in the lower half of the cam is significantly shorter per degree of rotation of the reel than is cam path in the upper part. It will be noted that the situation is the opposite in the conventional arrangement. This reduction in length of the cam path in the lower part where the fingers are undergoing significant loading from the engagement with the crop significantly reduces the speed of movement of the cam followers in the lower part and thus reduces forces and wear on the cam follower in the lower part. It will be noted that in order to achieve this reduced cam path length, the cam track moves to a position radially inward of the path of movement of the bat axis in the lower part of the cam path whereas the cam path is outside the path of movement of the bat axis in the upper part of the cam. Again it will be appreciated that this arrangement is opposite in the conventional arrangement.

As set forth above, the value of angular lead, A1, will vary through each rotation, but can never shrink to zero or an over center condition will occur, causing the fingers to flip. Also, as A1 approaches zero the reaction forces exerted by the cam path to the cam follower become very high (theoretically infinite). For the same reasons the angular lag of a conventional design can never shrink to zero. This shows that the new invention operates in distinctly different angular range from the conventional design.

Another difference is in the reaction force created when the follower contacts the cam track. The cam track/follower arrangement usually consists of a rolling member trapped between closed surfaces. Note that in the convention trailing arrangement, if crop load is applied to the fingers in the direction shown, the torque created will be opposed by a corresponding reaction force between the cam follower and the inner surface of the cam track. In the arrangement of the present invention, the same crop loads results in a reaction force on the outer surface of the cam track.

The arrangement as described above has the following advantages:

a) Advantageous geometric relationships allow the device to offer superior mechanical advantage to the conventional design when averaged throughout a complete rotation. (This is true even when comparing arrangements with equal length crank arms, identical finger patterns and identical length cam paths.) This allows the invention to provide lowered forces on the mechanical components and/or increased range of finger movements.

b) The device offers greater clearance to ground and to crops for the cam, cam followers, and crank arms. This gives improved crop flow by removing obstructions and reducing risk of crop getting tangled in the cam components.

c) The device makes longer crank arms more practical since the longer arms have no adverse affect on clearance to ground and crops. The longer crank arms provide a further increase to the mechanical advantages of the system.

d) The device reduces cam wear due the cam surface/follower contact characteristics. In the new invention crop load creates reaction between the cam roller and the concave outer surface of the cam path. In conventional designs, the crop load creates reaction forces between the cam follower and the convex inner surface of the cam path. Although both cases are theoretically point to point contact, real systems under load always have deflection at the point of contact. The contact characteristic of the new invention concave outer surface will offer superior bearing area under load, and therefore decreased wear characteristics.

e) The device offers reduced cam wear in the portion under heavy crop load since the cam path in the loaded area (lower half of cam) is shorter than the conventional design. The shorter path results in slower follower velocity and therefore reduced mechanical wear.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A crop harvesting header comprising:

a header frame structure arranged for movement in a direction of working movement across ground carrying a crop to be harvested;

a cutter bar arranged across a forward edge of the header frame structure for cutting the crop;

a cut crop transport arrangement mounted on the header frame structure for receiving and transporting the cut crop for further processing;

and a reel for controlling movement of the crop in the area over the cutter bar;

the reel being mounted on the header frame structure for movement therewith in the direction of movement and for rotation about a reel axis generally parallel to the cutter bar;

the reel having a plurality of reel bats at spaced positions around the reel axis each having reel fingers projecting generally radially outwardly from the reel axis;

each of the reel bats being pivotal about a respective bat axis parallel to the reel axis so as to vary the angle of the fingers about the bat axis as the reel rotates;

a stationary cam mounted on the header frame structure at the reel in stationary position relative to the reel axis;

each bat having associated therewith a crank arm with a cam follower on the crank arm which follows the cam as the reel rotates such that the movement of the follower in the cam as the reel rotates relative to the cam causes the crank arm to move relative to the bat axis to generate the required pivotal movement of the bat;

wherein, for each of the bats, the cam follower is arranged in the cam at a position which is angularly advanced about the reel axis relative to the bat axis.

2. The header according to claim 1 wherein, for each bat, the respective crank arm has an end thereof opposite the cam follower directly connected to the bat at a fixed angle relative thereto.

3. The header according to claim 2 wherein the opposite end of the crank arm is fixed to the bat so as to rotate about the bat axis.

4. The header according to claim 2 wherein the angle between the crank arm and the bat fingers is greater than 90 degrees.

5. The header according to claim 2 wherein the angle between the crank arm and the bat fingers is in the range 110 to 160 degrees.

6. The header according to claim 1 wherein the angle between the crank arm and the bat fingers is of the order of 135 degrees.

7. The header according to claim 1 wherein the cam is arranged such that the path length in a bottom half is less than a path length in an upper half.

8. The header according to claim 1 wherein the cam is arranged such that the cam lies radially inwardly of the path of the bat axes in a bottom part of the cam and lies radially outwardly of the path of the bat axes in an upper part of the cam.

9. The header according to claim 1 wherein the cam is arranged such that the path length thereof per degree of rotation of the reel is shorter in the angles of movement of the reel where the fingers are in engagement with the crop than at other angles.

10. The header according to claim 1 wherein the length of the crank arm from the bat axis to an axis of the cam follower is at least 3.0 inches.

11. The header according to claim 10 wherein the length of the crank arm from the bat axis to the cam follower axis is of the order of 5.0 inches.

12. The header according to claim 1 wherein the reel is arranged such that the bat fingers at bottom dead center of the reel relative to the reel axis are in front of the cutter bar.

13. The header according to claim 1 wherein the cam is arranged such that the bat fingers follow a finger pattern in which the bat fingers are angularly advanced about the respective bat axis to the greatest extent at a position in front of bottom dead center, are generally radial at the bottom dead center and are angularly retarded to the greatest extent at a position behind and upwardly of the cutter bar.

* * * * *